United States Patent
Heimes

(10) Patent No.: US 9,699,841 B2
(45) Date of Patent: Jul. 4, 2017

(54) AC DRIVEN LED LIGHT WITH DIGITAL CONTROL OF COLOR AND INTENSITY

(71) Applicant: BAE Systems Controls Inc., Endicott, NY (US)

(72) Inventor: Felix O. Heimes, Endwell, NY (US)

(73) Assignee: BAE Systems Controls Inc., Endicott, NY (US)

( * ) Notice: Subject to any disclaimer, the term of this patent is extended or adjusted under 35 U.S.C. 154(b) by 4 days.

(21) Appl. No.: 14/912,461

(22) PCT Filed: Apr. 9, 2015

(86) PCT No.: PCT/US2015/025119
§ 371 (c)(1),
(2) Date: Feb. 17, 2016

(87) PCT Pub. No.: WO2015/195187
PCT Pub. Date: Dec. 23, 2015

(65) Prior Publication Data
US 2016/0205735 A1    Jul. 14, 2016

Related U.S. Application Data

(60) Provisional application No. 62/013,253, filed on Jun. 17, 2014.

(51) Int. Cl.
*H05B 33/08* (2006.01)
*B64D 11/00* (2006.01)
*H05B 37/02* (2006.01)

(52) U.S. Cl.
CPC ......... *H05B 33/0815* (2013.01); *B64D 11/00* (2013.01); *H05B 33/083* (2013.01);
(Continued)

(58) Field of Classification Search
CPC ............ H05B 33/0815; H05B 33/0845; H05B 33/0803; H05B 33/0854; H05B 33/0812; H05B 33/0833; H05B 33/0848
(Continued)

(56) References Cited

U.S. PATENT DOCUMENTS 4,580,196 A    4/1986 Task
6,388,393 B1    5/2002 Illingworth
(Continued)

FOREIGN PATENT DOCUMENTS

EP    2019569    1/2009

*Primary Examiner* — Tuyet Vo
(74) *Attorney, Agent, or Firm* — Scott J. Asmus; Maine Cernota & Rardin

(57) ABSTRACT

A full color LED light for aircraft interiors is described, comprising a housing containing at least three differently colored groups of light emitting diodes, a controller for the groups of light emitting diodes and an alternating current power source. The controller distributes the alternating current to LED groups, providing a desired intensity of each differently colored group, producing a desired blended output color. At least one switching circuit receives input current from the power source, via the controller, and directs current to LED subgroups such that a near optimal voltage drop is maintained, given the varied voltage drops of the LED subgroups, regardless of the input voltage, in light of the voltage rating of the LEDs. Embodiments provide for measurement or estimation of current profiles, thermal profiles, and series resistance, allowing accurate measurement of lumen depreciation over time. Additional embodiments include a feedback circuit to temper input power fluctuations.

5 Claims, 8 Drawing Sheets

(52) U.S. Cl.
CPC ..... *H05B 33/0812* (2013.01); *H05B 33/0866* (2013.01); *H05B 33/0893* (2013.01); *B64D 2011/0038* (2013.01); *H05B 33/0803* (2013.01); *H05B 37/0254* (2013.01)

(58) Field of Classification Search
USPC ......... 315/247, 185 S, 224, 225, 209 R, 291, 315/307–326
See application file for complete search history.

(56) References Cited

U.S. PATENT DOCUMENTS

| | | | |
|---|---|---|---|
| 7,055,994 B2 | 6/2006 | Martin | |
| 7,307,391 B2 | 12/2007 | Shan | |
| 7,525,254 B2 | 4/2009 | Lys et al. | |
| 8,025,423 B2 | 9/2011 | Hancock et al. | |
| 8,115,411 B2 | 2/2012 | Shan | |
| 8,450,935 B2 * | 5/2013 | Neuman | H05B 33/0842 315/185 R |
| 2005/0063194 A1 | 3/2005 | Lys et al. | |
| 2007/0285031 A1 | 12/2007 | Shteynberg et al. | |
| 2009/0284172 A1 * | 11/2009 | Maschietto | H05B 33/083 315/294 |
| 2010/0049454 A1 | 2/2010 | Irissou et al. | |
| 2011/0266958 A1 * | 11/2011 | Tsai | H05B 33/083 315/152 |
| 2012/0081009 A1 | 4/2012 | Shteynberg et al. | |
| 2013/0026932 A1 * | 1/2013 | Lenk | H05B 37/02 315/186 |
| 2013/0082616 A1 * | 4/2013 | Bradford | H05B 33/0893 315/193 |
| 2013/0127353 A1 | 5/2013 | Athalye et al. | |
| 2013/0162149 A1 | 6/2013 | van de Ven et al. | |
| 2015/0115816 A1 * | 4/2015 | Bradford | H05B 33/083 315/192 |
| 2015/0115830 A1 * | 4/2015 | Siessegger | H05B 33/0803 315/291 |
| 2016/0029455 A1 * | 1/2016 | Aydin | H05B 33/0827 315/193 |

\* cited by examiner

AC DRIVEN LED LIGHT WITH DIGITAL CONTROL OF COLOR AND INTENSITY

RELATED APPLICATIONS

This application claims the benefit of U.S. Provisional Application No. 62/013,253, filed Jun. 17, 2014. This application is herein incorporated by reference in its entirety for all purposes.

FIELD OF THE INVENTION

The present invention relates to lighting and, more particularly, to full color aircraft interior lighting using (L)ight (E)mitting (D)iodes (LEDs) and direct drive alternating current (AC) techniques.

BACKGROUND OF THE INVENTION

Light Emitting Diodes (LEDs) are rapidly becoming today's leading lighting technology thanks to their ability to provide high quality light at very low power levels with the potential for extremely long life.

Existing LED lighting solutions typically utilize AC input power at each lighting fixture and direct current (DC) power to drive the LEDs. An AC to DC converter stage is contained within each fixture to provide the DC power used to drive the LEDs contained therein.

Also available are LED fixtures which lack the AC to DC converter stage, hereinafter referred to as DC-DC LEDs. These lights utilize DC input power at each lighting fixture and DC power to drive the LEDs, however, since AC is typically supplied because of inherent transmission advantages, these fixtures will still require an AC to DC conversion stage to function. The AC/DC converter stage, in these fixtures, typically resides outside the light fixture itself and produces the necessary power for several light fixtures. Such light fixtures may also require the use of more than one source of power to prevent DC power transmission related issues, such as dimness or a reduction in color accuracy at a far end of such a system.

Despite these inherent limitations, a DC-DC system architecture may allow for a reduction in the size and cost of the lighting fixtures, while increasing their efficiency, since such a design eliminates the need to convert AC power within the light. Such a design enables a systems engineer to optimize the size and weight of an external power converter, achieving efficiencies which could not be achieved when designing each fixture for general usage.

LED fixtures which use unconverted AC input power to directly drive LEDs (hereinafter AC-AC LEDs) are also available. In AC-AC LEDs, the AC waveform is typically applied directly to the LED string. Drawbacks of current AC-AC light designs over AC-DC and DC-DC LED systems are that current AC-AC lights have reduced levels of controllability, due in part to the need to accommodate constantly fluctuating current and voltage input.

Another problem with AC-AC LED control is that fluctuations in the AC line peak voltage level can result in noticeable flicker in the light output. This problem is particularly severe in aircraft systems, since power is typically derived from an engine mounted generator, the output of which is impacted by changes in engine speed as well as other loads on the aircraft's limited resources.

Although today's LEDs may be robust, associated enabling circuitry often prevents the LEDs from fully delivering on their promised benefits of low per lumen power consumption and long life, while adding weight, complexity and sources of inefficiency. To enable use of this technology in aircraft and similar industries, reliability, at least, must be improved.

An additional issue relevant to commercial aircraft is systems health monitoring. Aircraft health monitoring involves the use of airplane data to provide enhanced fault forwarding, troubleshooting, and historical fix rates to reduce schedule interruptions and increase maintenance efficiency. While today's commercial aircraft have a great deal of health monitoring capability in other areas; the cabin is a black hole in this regard. One of the greatest needs for health monitoring in the cabin is in LED lighting, since LED lights degrade over time and their color characteristics change. This is especially applicable to large arrays of LED fixtures, commonly used as intricate mood lighting in modern passenger airliners, where even small differences in lighting may be noticed by a discerning traveler. The age of lights in such an array may also significantly vary, such as when a failed fixture is replaced, exacerbating such problems.

What is needed, therefore, are techniques for improving the reliability and uniformity of full color aircraft LED solutions while reducing their weight and complexity and increasing their efficiency and controllability.

SUMMARY OF THE INVENTION

One embodiment of the present invention provides a full color array of light emitting diode for aircraft interiors which runs on alternating current, without transformation to direct current, comprising: a plurality of light emitting diodes comprising substantially equal numbers of light emitting diodes of at least three different colors, wherein light emitting diodes of each color are arranged in a series configuration; the plurality of light emitting diodes in operative communication with a closed loop feedback circuit; the closed loop feedback circuit in operative communication with a source of alternating current; wherein the closed loop feedback circuit is configured to smooth and direct the source of alternating current to the light emitting diodes, thereby maintaining a substantially constant power to the light emitting diodes by accommodating changes in voltage of the alternating current through adjustment of the current provided to the plurality of light emitting diodes, whereby flicker is reduced to levels imperceptible to a typical human observer.

Another embodiment of the present invention provides such a full color light emitting diode array for aircraft interiors, wherein the closed loop feedback circuit is implemented in software.

A further embodiment of the present invention provides such a full color light emitting diode array for aircraft interiors, wherein the closed loop feedback circuit is implemented in a field programmable gate array.

Yet another embodiment of the present invention provides such a full color light emitting diode array for aircraft interiors, wherein the closed loop feedback circuit comprises a proportional-integral-derivative controller in operative communication with an analog to digital converter, configured to provide monitor line voltage communicate this information to the proportional-integral-derivative controller, and a current sense circuit, configured to monitor current and communicate this information to the proportional-integral-derivative controller.

A yet further embodiment of the present invention provides such a full color light emitting diode array for aircraft interiors, wherein the proportional-integral-derivative controller is used to compute nominal light emitting diode intensity and direct the necessary current to the plurality of light emitting diodes.

Still another embodiment of the present invention provides such a full color light emitting diode array for aircraft interiors, wherein the proportional-integral-derivative controller also takes into account information regarding current, temperature and series resistance of the light emitting diodes when calculating the nominal intensity.

One embodiment of the present invention provides a health monitoring and color adjustment mechanism for light emitting diodes comprising: a microcontroller in operative communication with a plurality of light emitting diodes of a plurality of colors; at least one temperature probe in operative communication with the microcontroller; at least one current sensor in operative communication with the microcontroller; at least one circuit configured to provide an estimate of the series resistance of the plurality of light emitting diodes, in operative communication with the microcontroller; and at least one storage means in operative communication with the microcontroller, configured to periodically record measurements of temperature, current and estimated series resistance to the storage means, creating a history of such data, wherein the current delivered to the light emitting diodes is algorithmically altered proportionately to the thermal, current and series resistance history, enabling the light emitting diodes to provide consistent illumination over their lifespan, despite the effects of aging.

Another embodiment of the present invention provides such a health monitoring and color adjustment mechanism for light emitting diodes, wherein the plurality of light emitting diodes are of varied colors, the at least one storage means is configured to store information relating to the color of an LED and the algorithm by which thermal, current and series resistance history are taken into account to provide consistent illumination over the light's lifespan further incorporates information as to the color of the light emitting diode.

A further embodiment of the present invention provides such a health monitoring and color adjustment mechanism for light emitting diodes, further comprising at least one temperature probe for every 12" of length to be monitored.

Yet another embodiment of the present invention provides such a health monitoring and color adjustment mechanism for light emitting diodes, wherein the current and temperature data is collected once per minute.

A yet further embodiment of the present invention provides such a health monitoring and color adjustment mechanism for light emitting diodes, wherein the data and algorithm may be accessed and modified wirelessly.

Still another embodiment of the present invention provides such a health monitoring and color adjustment mechanism for light emitting diodes wherein the ZigBee standard is used to enable the wireless functionality.

A still further embodiment of the present invention provides such a health monitoring and color adjustment mechanism for light emitting diodes, wherein the algorithm is empirically derived.

Even another embodiment of the present invention provides such a health monitoring and color adjustment mechanism for light emitting diodes, wherein the empirically derived algorithm is derived by applying machine learning algorithms to a multitude of empirically derived data.

One embodiment of the present invention provides a method for developing an algorithm for health monitoring and color and intensity adjustment of light emitting diodes comprising: procuring initial data regarding age and use related degradation for a light emitting diode to be used; establishing a first algorithm for estimating degradation of the light emitting diode or diodes based on the initial data, wherein the first algorithm takes into account a plurality of measured operating conditions and adjusts an intensity of the light emitting diode or diodes to compensate for the expected degradation; arranging the light emitting diode or diodes similarly to how they are expected to be arranged in a final commercial embodiment for which health monitoring and color adjustment algorithms are to be calibrated; subjecting the light emitting diode or diodes to testing; measuring degradation of the light emitting diode or diodes over time; modifying the first algorithm, by fitting the data generated by testing to the expected degradation profile based on the initial data, to produce a second algorithm; fielding the light emitting diode or diodes for a period of time sufficient to cause them to undergo degradation; extracting data regarding the measured operating conditions; and modifying the second algorithm by fitting the data regarding the measured operating conditions to the expected degradation profile based on the second algorithm, producing an empirically derived algorithm for health monitoring and color and intensity adjustment of light emitting diodes.

Another embodiment of the present invention provides such a method for developing an algorithm for health monitoring and color and intensity adjustment of light emitting diodes further comprising: returning the fielded light emitting diodes to service; periodically extracting data regarding the measured operating conditions; and modifying the empirically derived algorithm for health monitoring and color and intensity adjustment of light emitting diodes by fitting the data regarding the measured operating conditions to the previously estimated degradation profile.

A further embodiment of the present invention provides such a method for developing an algorithm for health monitoring and color and intensity adjustment of light emitting diodes wherein the measured operating conditions comprise temperature, current, series resistance and voltage, which may be directly measured or inferred.

Yet another embodiment of the present invention provides such a method wherein testing includes exposure to extreme voltage and temperature operation to accelerate the onset of age related effects.

A yet further embodiment of the present invention provides such a method for developing an algorithm for health monitoring and color and intensity adjustment of light emitting diodes method wherein the initial data comprises LM-80 test data.

Still another embodiment of the present invention provides such a method for developing an algorithm for health monitoring and color and intensity adjustment of light emitting diodes further comprising uploading the empirically derived algorithm for health monitoring and color and intensity adjustment of light emitting diodes to the fielded light emitting diode or diodes, enabling more accurate color and intensity adjustment as the algorithm is refined.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
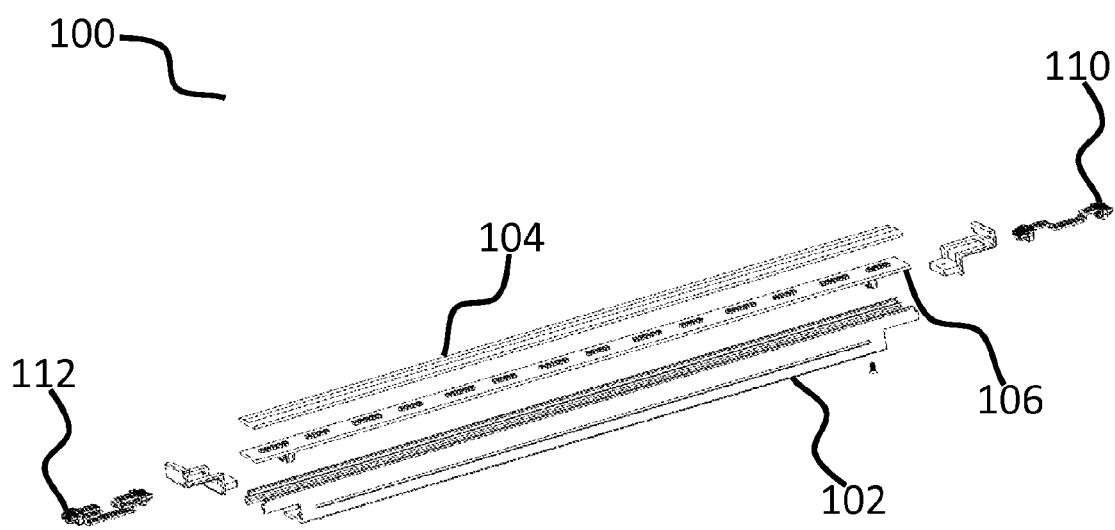
FIG. 1 is a front, top, right-side exploded perspective view of an AC full color LED light fixture in accordance with one embodiment of the present disclosure.

In order to overcome the drawbacks of typical LED designs, such as AC-DC LED light fixtures, a full color capable AC-AC LED light fixture 100, as shown in FIG. 1 for aircraft interiors was created, providing weight savings, reduced size, smaller part count and lower cost.

Weight savings in this design result primarily from the omission of the heavy and costly AC-DC high power converter circuit of AC-DC LED light designs in the AC-AC LED light design 100, as shown in FIG. 1 allows for a reduction in the size, cost, complexity and weight of the light while increasing efficiency by removing inefficiencies associated with power conversion. The reliability of the AC-AC LED design 100 also has the potential to exceed that of a more traditional AC-DC LED, due to a lower part count and the fact that heat generation from the power converter is removed from the light. Lower heat generation will also result in slower and more manageable color and intensity changes over the life of the fixture.

The reduction in cross section of the AC-AC light 100 achieved through omission of the power converter will also result in the AC-AC light 100 being easier to replace while enabling greater flexibility in how it is mounted to achieve optimal light distribution in various mounting locations.

Full Color Control

Figure 2:
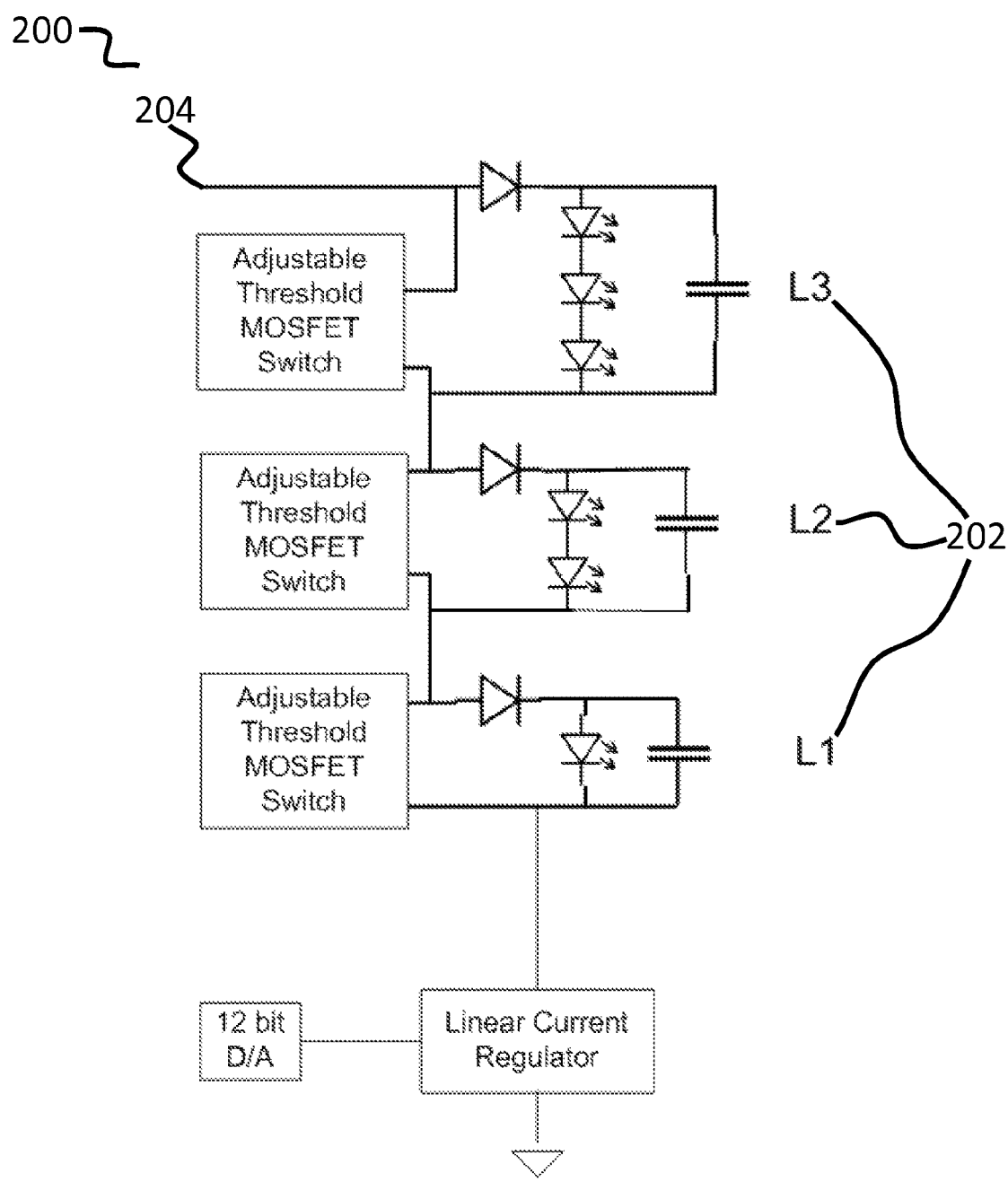
FIG. 2 is a schematic showing an AC LED light drive circuit in accordance with one embodiment of the present disclosure.

Through the use of a novel switching configuration 200, as shown in FIG. 2, the benefits of an AC-AC LED light fixture 100 for full color applications has been realized. The switching configuration allows AC driven LEDs to achieve desirable power factor and current waveforms by maintaining optimal power to subgroups of LEDs 202 dependent on the voltage provided by the AC power source 204 at a given point in time.

Such an AC-AC LED light 100 works by dropping the AC line voltage 204 directly across a string of LEDs using floating metal-oxide-semiconductor field-effect transistor (MOSFET) switches 400 coupled with at least one linear current regulator 402. Such a switching circuit 200 allows an AC-AC LED light 100 to achieve power factor greater than 0.9 and performance comparable to a typical AC-DC light without requiring heavy and expensive inductive components. An additional benefit of this design is that it produces substantially less electromagnetic interference (EMI) than current designs.

Figure 3:
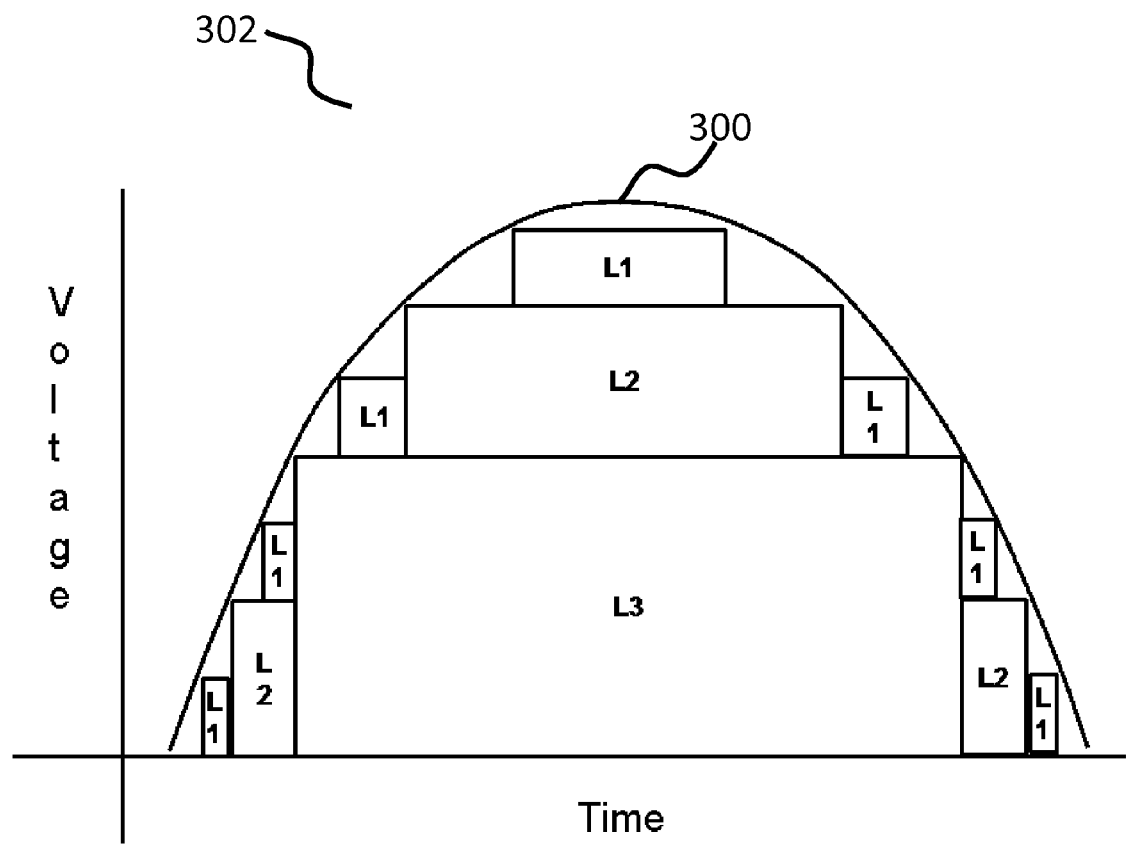
FIG. 3 is a graph showing sub-circuit activation time contrasted with AC voltage, shown over one-half of a complete AC waveform, which, in embodiments, is fully rectified, such that the graph, if extended, would simply repeat the half-wave form, in accordance with one embodiment of the present invention.

The switching circuit 200 achieves these benefits by sequencing through sub-groups of LEDs as the line voltage increases from zero volts up to the peak AC voltage 300, as shown in FIG. 3, which shows one half of a rectified AC waveform 302.

In embodiments, there may be three such switches 400 controlling current across three LED stacks 202. Each LED stack 202 may be approximately 2 times the voltage drop of the stack below it for optimal efficiency. Each stack includes a capacitor in parallel with the LEDs to regulate current as the switches 400 cycle. In one embodiment, the voltage stacks 202 (i.e. L1, L2 & L3) have forward voltage drops of 20, 40, and 80 volts to cover the full 115 volt (v) root mean square (RMS) voltage range.

FIG. 3 shows the sequencing of when each stack of LEDs 202 is conducting current from line voltage for a half cycle of the AC wave. The 20 volt stack (L1) is switched on first. Once the voltage exceeds the threshold for the 40 volt (L2) stack, L2 also turns ON. The third step in the sequence switches the L2 stack off, while enabling the L3 LED stack. The fourth step involved enabling L1, L2 and L3 stacks simultaneously to handle the AC wave's peak voltage. As voltage decreases from its peak, the LED stacks are enabled and disabled in the reverse order of when voltage was increasing. This process of alternately switching the various stacks continues as input voltage fluctuates, allowing for a substantially smooth current draw from the line voltage. At peak AC voltage 300, an AC-AC LED fixture 100 in accordance with this embodiment must typically contain enough LEDs in series to drop the peak voltage of the AC power source 204 to an appropriate level.

Figure 4:
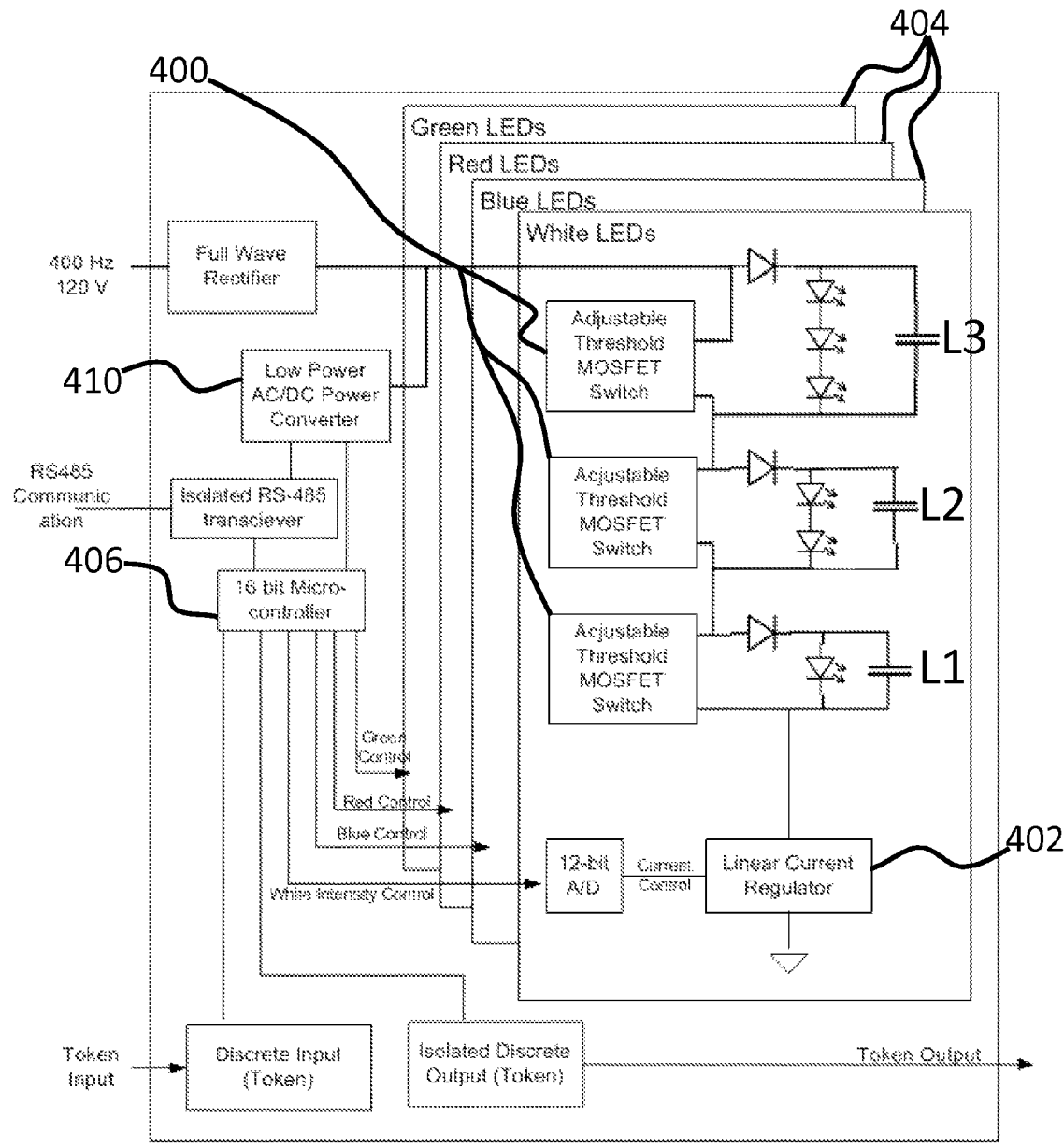
FIG. 4 is a schematic showing an aircraft full color AC light circuit diagram in accordance with one embodiment of the present invention.

To enable full color LED lighting control of the aforementioned light fixtures, control circuitry 406, as shown in FIG. 4, must be added to allow for independent control of at least 3 differently colored LEDs 404 clustered in close proximity to one another. In embodiments, red, green and blue (RGB) LEDs are used. In other embodiments, a white LED could also be added as a fourth LED color. Control of intensity, and thereby color, in embodiments, is achieved through adjustment of current through linear current regulators 402. Each color to be controlled will contain its own linear current regulator 402. This change in intensity of one or more colors relative to other colors produces mixed output color in a controllable manner. For example, various shades of purple can be achieved with appropriate control of red and blue LED intensity.

Brightness of the LEDs, in embodiments, may be controlled through the use a digital potentiometer in operative communication with a microcontroller 406. In such an embodiment, the microcontroller 406 would receive color commands from the system and adjust the digital potentiometer to achieve the desired overall output color. Brightness may also be controlled through a linear current regulator that is itself controlled through a Digital-to-Analog (D/A) converter, allowing very fine color control of each color channel.

In this switching configuration, switching frequency is proportional to the frequency of the AC waveform, which is typically 400 Hz for aviation electronics systems. The relatively high frequency of the aircraft AC power allows for smaller capacitive components and reduces undesirable effects of the AC approach such as flicker and stroboscopic effects as compared to lighting powered by more traditional 50/60 Hz AC power sources.

In embodiments, each channel is one color (Red, Green, Blue, or White). Each channel is controlled by a microcontroller 406 independently to produce a desired overall output color. Control of color may be obtained through the use of a digital potentiometer or special current control integrated circuit. In embodiments using a digital potentiometer, the digital potentiometer would control the amount of current flowing through the LEDs to control the brightness of each color. Typical embodiments utilize one digital potentiometer for each color of LED.

Alternatively, a special integrated circuit designed for accurate color control could be used. Such a circuit could be driven by a digital to analog converter controlled by the microcontroller 406.

Figure 7:
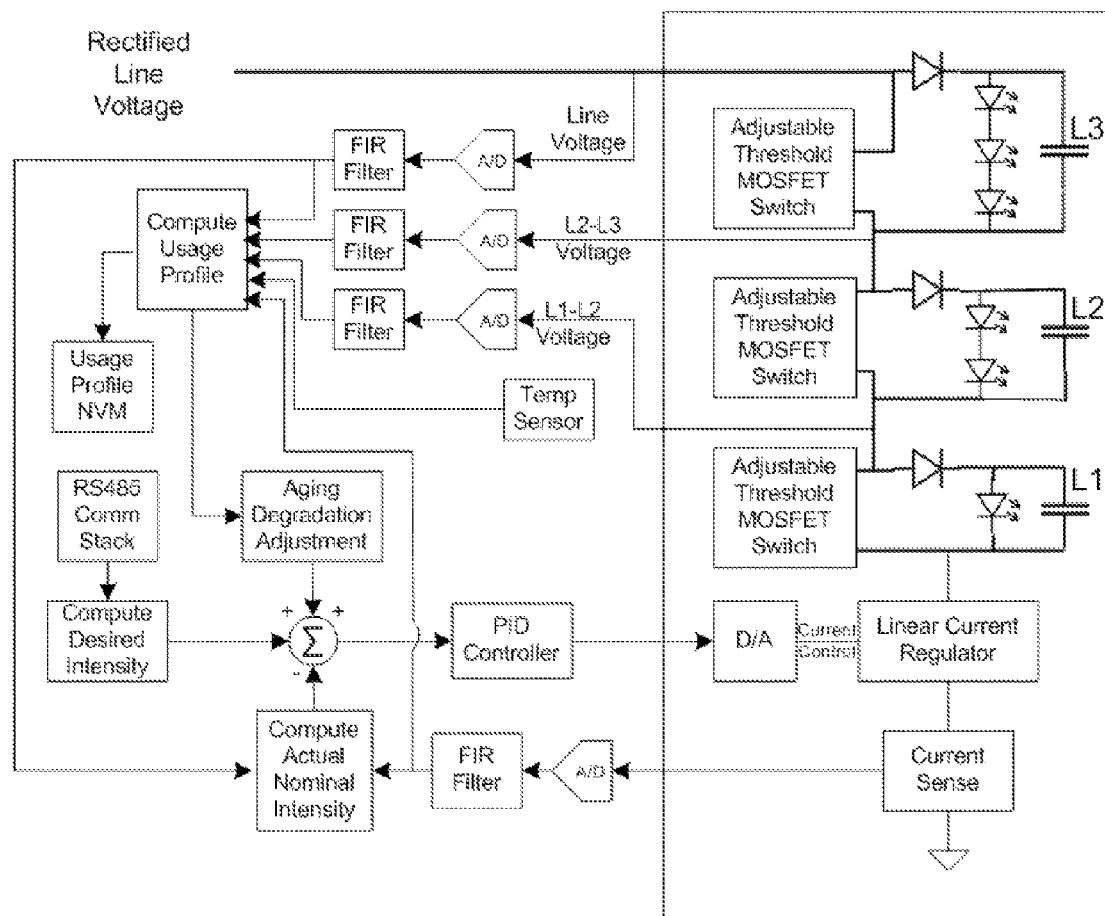
FIG. 7 is a schematic showing the aircraft full color AC light circuit of FIG. 4 having additional current and voltage sensing capabilities as well as incorporating a closed loop Proportional-Integral-Derivative (PID) controller in accordance with one embodiment of the present disclosure.

Additional circuitry, as depicted in FIG. 7, may be added to accommodate for voltage fluctuation in input voltage. Embodiments employ a control loop feedback mechanism, which calculates an error value as the difference between a measured process variable and a desired set-point, and may take into account the desired intensity, nominal intensity, adjustments to account for the age of the LED, group of LEDs or fixture, voltage and current to provide improved current control and eliminate visible intensity scintillations. A Proportional-Integral-Derivative (PID) controller may be used to provide such functionality, in embodiments. The input to the PID loop of the desired intensity of the LEDs may be commanded by an external controller through an RS-485 serial connection. The PID loop may also include an aging degradation algorithm to compute the actual lumen depreciation of the LEDs due to long term usage profiles. The output of the aging degradation algorithm may be an adjustment in the lumen command to offset aging effects.

Further embodiments may monitor line voltage through an analog-to-digital (A/D) converter. A current sense circuit could also be added to embodiment to enable accurate current measurement. Both of these values may be utilized to compute the actual nominal LED intensity taking into account fluctuations in voltage and inaccuracy in current control. In one embodiment image stabilization would be implemented in a field programmable gate array (FPGA) to enable high speed closed loop control. In another embodiment image stabilization may be implemented in the microcontroller software.

Health Monitoring & Aging Modeling

The two primary factors that impact the aging characteristic of LEDs are current flow through the device and temperature. Tracking the history of these parameters over the life of the fixture can enable active aging compensation. An important consideration in this type of approach is that different color LEDs will age at different rates and will be driven at varying duty cycles depending on airline preferences for color.

Figure 5:
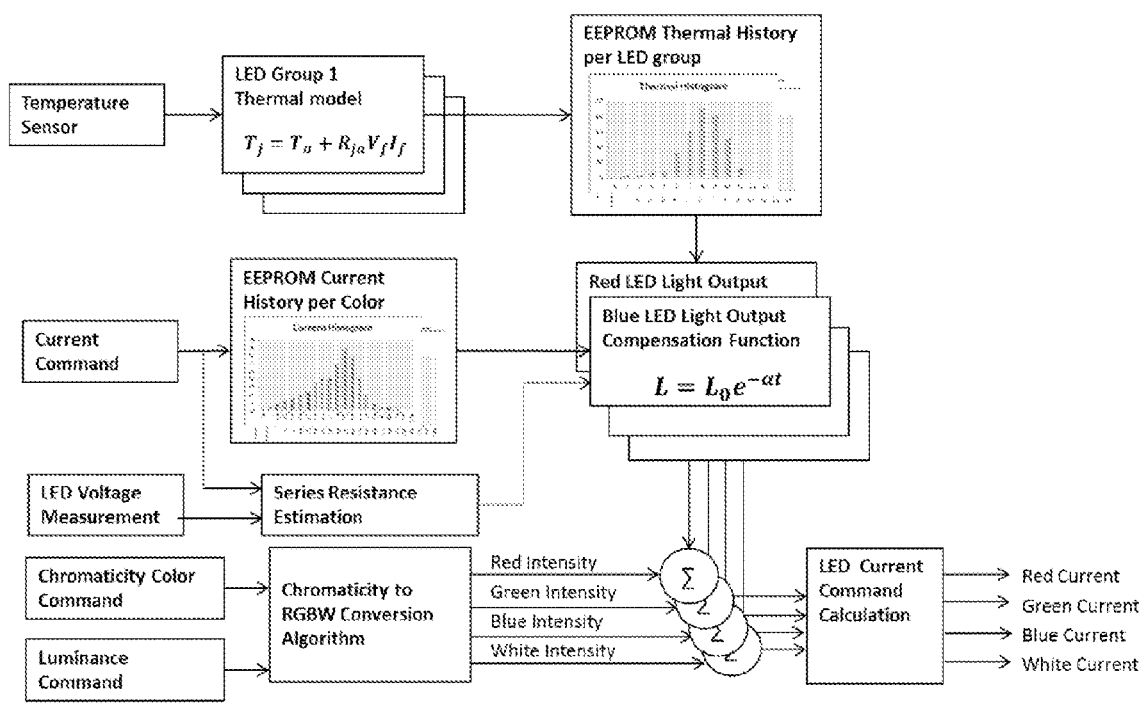
FIG. 5 is a schematic showing an LED aging compensation algorithm in accordance with one embodiment of the present invention.

Embodiments of LED light fixtures in accordance with the present disclosure will have health monitoring and LED aging adjustment capabilities built in, as described in FIG. 5. In such embodiments, a microcontroller 406 is used to monitor the current and temperature of the LED fixture over its life at predefined intervals. In doing so, it accumulates a history of the current and temperature exposure of LEDs contained therein over time. Algorithms for calculating the required current to produce a desired luminance of LEDs or groups thereof, taking into account exposure of LEDs and fixtures to heat, current and voltage, will be hosted in the light to enable self-adjustment of fixture sub-circuits to overcome aging and thermal effects. This will ensure that all light fixtures in an array will present a substantially uniform appearance, regardless of their age and location. This will represent a significant advance for lighting near sources of heat or cold, which are particularly susceptible to abnormal color change over their lifespans, and for replacement of light fixtures in an array. Histogram data generated, in embodiments, may be off-loaded wirelessly or through a connection port to fine tune and update the aging adjustment algorithm.

Embodiments of such an LED light fixture typically contain at least temperature sensor per 12 inch segment. The estimated junction temperatures may be accumulated in a histogram at a rate of approximately 1 minute. The histogram data could then be stored, preferably, in a non-volatile memory device.

Similarly to the temperature profiles, embodiments of the present disclosure will also accumulate current profile data. In such embodiments, the temperature data may be used in combination with the current data in a compensation algorithm to adjust the commanded luminosity to each LED color.

Some aging characteristics of LEDs are exhibited in increasing series resistance of the LEDs. Series resistance can be calculated on voltage and current measurements from the LED. With a current controlled LED, the current is known and the voltage drop across LEDs can be measured practically. The series resistance of the LEDs, in embodiments, is another measurement that is incorporated into the aging estimation algorithm.

Embodiments may employ additional circuitry, such as that shown in FIG. 7, to provide voltage and current sensing for the health monitoring algorithm. Intermediate stack voltages between the L3-L2 section and the L2-L1 section enable estimation of each LED layer voltage difference. This additional circuitry, along with current measurement, enables series resistance estimation, which may be used as part of estimation of LED aging effects.

Embodiments of the present disclosure may additionally store records of operating conditions, including temperature, current, and series resistance; a non-volatile memory may be used for such storage. These operating conditions may be accumulated throughout the life of the luminaire to capture the operating history of the LED light.

Embodiments will enable such algorithms to be updated for better accuracy after units have been in service for an extended period of time. Fielded units could be removed from service and the thermal/current histogram data extracted. Such lights could be tested in a lab environment, and the algorithms fine-tuned using actual conditions experienced in-service.

Figure 8:
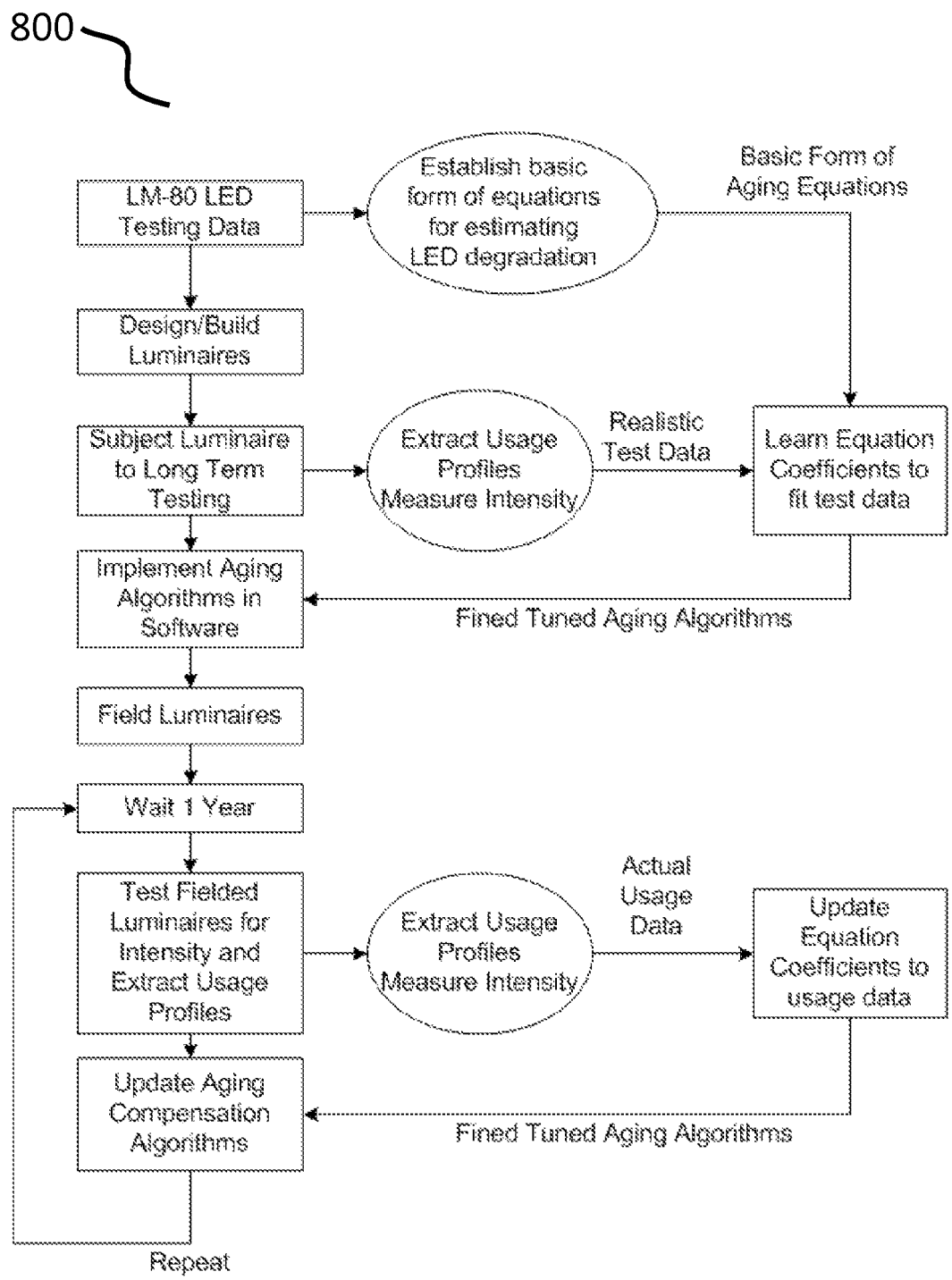
FIG. 8 is a flowchart describing a process of establishing and refining aging algorithms in accordance with one embodiment of the present disclosure.

Now referring to FIG. 8, a process whereby aging algorithms may be developed is described. Initially standard LM-80 data that is provided by LED manufactures may be utilized to establish a basic form of LED aging curves. These curves usually exhibit an exponential decay. LM-80 data, since it does not represent actual conditions, must be fine-tuned by taking into account the design aspects of the luminaire. The coefficients of the aging equations may then be adjusted based on the actual operating condition of the LEDs generated throughout their life, including thermal profiles, current profiles, and series resistance.

Following the electrical and mechanical design, luminaires are manufactured. The luminaires may then be subjected to long term testing to exercise the LEDs in the environment in which they will actually be fielded, which may different significantly to the conditions experienced during the LM-80 tests. Long term testing includes normal usage profiles and extreme voltage and temperature operation, to accelerate aging. Long term testing will exercise a large number of luminaires to widely varying cycles to reproduce a variety of damage accumulation scenarios including: thermal stress, radiation stress, electro-migration, delamination, hole growth in solder joints, and others. Testing may also include cycling with repeatable patterns using a variety of dwell times as well as random cycling.

Usage profiles stored in the lights may then be extracted at multiple times during the long term test program. Output light intensity may also be measured and linked with extracted usage profiles. These tests produce realistic test data of the aging characteristics of the actual final product.

The data from long term testing may then be utilized in off-line fitting algorithms to fine tune the aging equation coefficients, creating a tight match to the actual aging characteristics captured in testing. The fine-tuned algorithms may then be downloaded into production lights to improve upon the base automated aging compensation algorithm developed from the LM-80 data.

After an extended period of time of fielded use of the lights (notionally 1 year), the lights can be sampled in the field to extract actual usage profile data from the lights and measure their intensity output using test equipment. The data collected from the fielded lights will generally be of the same form as the prior data collected during long term testing. The same process of adjusting the aging equations may then be performed to update the aging algorithms to better reflect actual usage.

The updated algorithms may then be re-installed into the lights in the field, thereby improving their accuracy. The process can then be repeated as needed to compensate for aging effects.

The aging characteristics of LEDs are complex and cannot be accurately defined using analytical methods. The only way to accurately define the aging characteristics is through long term use of the LEDs. This precludes a good aging algorithm from being implemented in the luminaire when they are first fielded. There is simply not enough time to fully test and reveal the true aging characteristics. The process just described leverages the novel health monitoring approach of this invention to allow the luminaire to track its own usage for its entire life. By capturing these profiles in the luminaire the luminaires can be sampled throughout their life and the algorithms fine-tuned such that the aging compensation approach improves with time.

Self-Testing & Maintenance

Additional embodiments of the LED lighting fixture include various types of Built-In Test (BIT) procedures to ensure proper operation of the lighting system and to report faults back to a maintenance interface. Embodiments of the LED light fixture will include power up BIT, and continuous BIT. Examples of lighting faults to be detected by such tests include token line faults, address faults, and internal hardware faults.

The only maintenance action expected for LED lighting fixtures according to the previously described embodiments is to replace the light fixture. After a fixture is replaced a maintenance mode could be used to reset the light addressing and lighting zone, allowing the new light to seamlessly be incorporated into an existing array.

Embodiments of such LED lighting fixtures will also be able to report hardware part number, serial number, and software part numbers to via ZigBee or RS-485 data interfaces.

Other Features

A challenge for AC-AC LED 100 designs is that the AC voltage must be dropped across a series of LEDs. The larger the AC peak voltage, the more LEDs that must be utilized to provide this voltage drop. In conflict with this need, an aircraft LED strip is desired to be short for finer control of color longitudinally along the length of the cabin.

Figure 6:
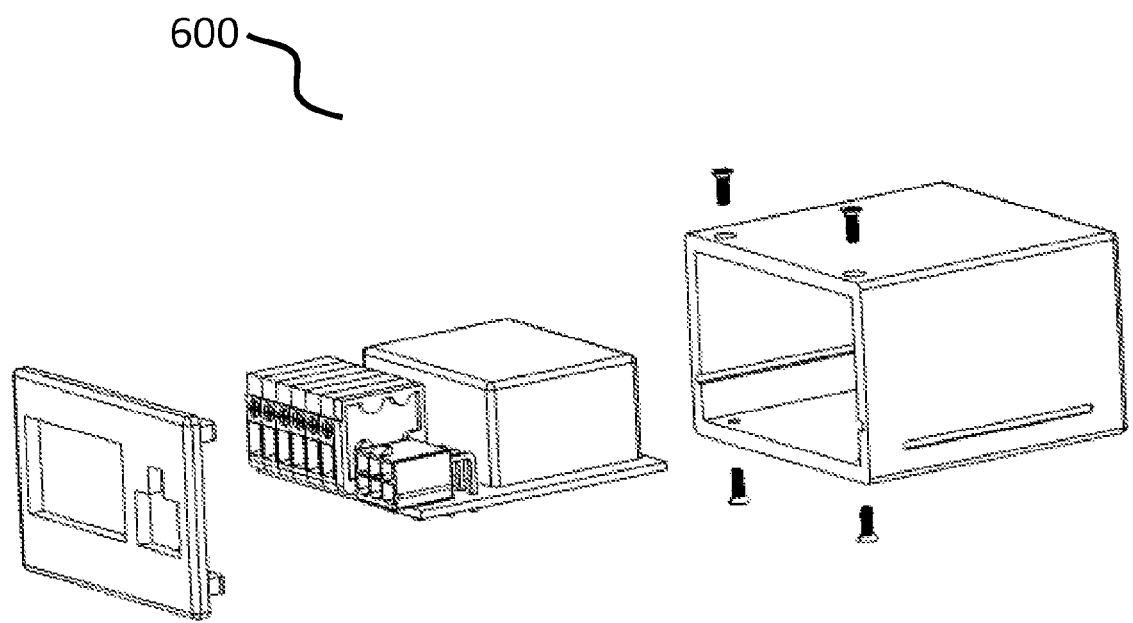
FIG. 6 is a front, top, left-side exploded perspective view of a transformer for an AC full color LED light fixture in accordance with one embodiment of the present disclosure.

To overcome this issue, embodiments may utilize an AC-AC transformer 600, as shown in FIG. 6, which may be internal or external to the fixture, to reduce the peak line voltage delivered to the AC light, allowing for shorter lengths of luminaires. The transformer 600 can provide power to single or multiple light strips. In embodiments, the lights and transformer assemblies utilize a common connector so that they can be connected easily in series. Such designs allow for an optimum AC light design for shorter lengths and the selection of LEDs with a focus on providing enhanced controllability.

Embodiments of the present disclosure may be modular in design, each light fixture may have identical input 110 and output 112 connectors and the light fixture hardware design being symmetrical, such that the same part number light could be installed on either the in-board and out-board sides of an aircraft. Such a design would also allow for the lights to be easily daisy chained. Embodiments of such designs may include a: microcontroller 406 (8 bit, 16 bit or 32 bit), RS485 communication to receive control commands from lighting controller, non-volatile memory, and isolated discrete inputs and outputs for configuration in the system. Although high power AC to DC conversion is obviated in this design, a low power AC/DC converter 410 to drive required low power digital electronics would still be necessary, in embodiments.

To account for fluctuations in line voltage from the power source, a closed-loop feedback circuit may be added. This circuit may utilize the source voltage input to the AC-AC light 100 in a closed-loop feedback control architecture to provide a current command adjustment, thereby maintaining a constant power to the LEDs. This circuit would adjust the current command to accommodate changes in input voltage, preventing flicker. Such a flicker compensation feedback loop could be implemented in analog circuitry or in software.

The AC-AC light 100, in embodiments, may utilize ½ watt LEDs to meet the need for dropping the 115 v RMS voltage to acceptable levels. For example, if typical ½ watt LEDs were used, which can operate at up to 160 mA at 9.6 volts, the smallest viable full control segment length for such LEDs would require 14 LEDs of each color to drop voltage to acceptable levels. Current drive range could be adjusted to meet the luminance requirements for an aircraft cabin. Such a segment would require between 3-5 watts of power.

In other embodiments, the light fixture may include wireless control capabilities. In such embodiments, a wireless control interface would replace the RS-485 interface. The wireless interface may preferably be a ZigBee specification low power mesh network wireless device, which could operate at 900 MHz, to eliminate interference with 802.11 networks in common commercial use (e.g. by aircraft services such as In-Flight Entertainment systems).

Such embodiments could easily replace current AC-DC LED light fixtures in modern commercial passenger aircraft, as the external connections could be made identical. Such embodiments could still receive ~115 v RMS power at 400 Hz, use RS485 for communication purposes and utilize token inputs on the input connectors and feed these signals through to the output connector such that the lights can be daisy chained.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. A full color array of light emitting diode for aircraft interiors which runs on alternating current, without transformation to direct current, comprising:
    a plurality of light emitting diodes comprising substantially equal numbers of light emitting diodes of at least three different colors, wherein light emitting diodes of each color are arranged in a series configuration;
    said plurality of light emitting diodes in operative communication with a closed loop feedback circuit;
    said closed loop feedback circuit in operative communication with a source of alternating current;
    wherein said closed loop feedback circuit is configured to smooth and direct said source of alternating current to said light emitting diodes, thereby maintaining a substantially constant power to said light emitting diodes by accommodating changes in voltage of the alternating current through adjustment of the current provided to said plurality of light emitting diodes, whereby flicker is reduced to levels imperceptible to a typical human observer, and
    wherein said closed loop feedback circuit comprises a proportional-integral-derivative controller in operative communication with an analog to digital converter, configured to provide monitor line voltage communicate this information to the proportional-integral-derivative controller, and a current sense circuit, configured to monitor current and communicate this information to the proportional-integral-derivative controller.

2. The full color light emitting diode array for aircraft interiors of claim 1, wherein said closed loop feedback circuit is implemented in software.

3. The full color light emitting diode array for aircraft interiors of claim 1, wherein said closed loop feedback circuit is implemented in a field programmable gate array.

4. The full color light emitting diode array for aircraft interiors of claim 1, wherein said proportional-integral-derivative controller is used to compute nominal light emitting diode intensity and direct the necessary current to said plurality of light emitting diodes.

5. The full color light emitting diode array for aircraft interiors of claim 1, wherein said proportional-integral-derivative controller also takes into account information regarding current, temperature and series resistance of the light emitting diodes when calculating said nominal intensity.

* * * * *